United States Patent
Manabe

(10) Patent No.: US 8,815,460 B2
(45) Date of Patent: Aug. 26, 2014

(54) FUEL CELL SYSTEM

(75) Inventor: Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 592 days.

(21) Appl. No.: 13/122,452

(22) PCT Filed: Sep. 28, 2009

(86) PCT No.: PCT/JP2009/004915
§ 371 (c)(1),
(2), (4) Date: Apr. 4, 2011

(87) PCT Pub. No.: WO2010/052822
PCT Pub. Date: May 14, 2010

(65) Prior Publication Data
US 2011/0190959 A1    Aug. 4, 2011

(30) Foreign Application Priority Data

Nov. 5, 2008    (JP) .................................. 2008-284350

(51) Int. Cl.
*H01M 8/04*    (2006.01)
*H01M 16/00*   (2006.01)
*H01M 8/10*    (2006.01)

(52) U.S. Cl.
CPC ........ *H01M 8/0488* (2013.01); *H01M 8/04604* (2013.01); *H01M 8/04559* (2013.01); *H01M 8/04888* (2013.01); *H01M 16/006* (2013.01); *H01M 2008/1095* (2013.01); *H01M 2250/20* (2013.01); *Y02T 90/32* (2013.01); *Y02E 60/50* (2013.01)

USPC .......................................................... 429/432

(58) Field of Classification Search
CPC .................... H01M 8/04888; H01M 8/04559; H01M 8/0488; H01M 8/04604
USPC .......................................................... 429/432
See application file for complete search history.

(56) References Cited

U.S. PATENT DOCUMENTS

2004/0115487 A1 *    6/2004    Ichinose et al. .................... 429/9

FOREIGN PATENT DOCUMENTS

| DE | 10 2007 005 138 A1 | 8/2007 |
|---|---|---|
| JP | 2000-012059 A | 1/2000 |
| JP | 2006-73503 A | 3/2006 |
| JP | 2006-310246 A | 11/2006 |
| JP | 2007-209161 A | 8/2007 |
| JP | 2008-91319 A | 4/2008 |
| JP | 2008-166076 A | 7/2008 |

* cited by examiner

*Primary Examiner* — Maria J Laios
(74) *Attorney, Agent, or Firm* — Kenyon & Kenyon LLP

(57) ABSTRACT

Even in a case where a rapid variance is demanded as to the input voltage of a converter and the output terminal voltage of a fuel cell, stable converter control is realized. On judging that the change ratio of the demand power of a fuel cell exceeds a set threshold value, a controller executes converter stabilization processing. First, the controller controls a battery converter so that an input voltage of an inverter becomes a set target input voltage. Then, after the input voltage of the inverter reaches the target input voltage, the controller controls an FC converter so that an output terminal voltage of the fuel cell becomes a set target output terminal voltage.

6 Claims, 8 Drawing Sheets

FUEL CELL SYSTEM

This is a 371 national phase application of PCT/JP2009/004915 filed 28 Sep. 2009, which claims priority to Japanese Patent Application No. 2008-284350 filed 5 Nov. 2008, the contents of which are incorporated herein by reference.

TECHNICAL FIELD

The present invention relates to a fuel cell system. More particularly, it relates to a hybrid type fuel cell system comprising a fuel cell and a battery as power sources.

BACKGROUND ART

As to a fuel cell system mounted in a vehicle or the like, various hybrid type fuel cell systems each comprising a fuel cell and a battery as power sources have been suggested to cope with a rapid variance of a load in excess of the power generation ability of a fuel cell (see, e.g., Patent Document 1 as follows).

FIG. 7 is a diagram illustrating a hybrid type fuel cell system (hereinafter referred to as the FCHV system) mounted in the vehicle. In an FCHV system 100, a fuel cell 110 and a battery 120 are connected in parallel with a load 130, and the load 130 is connected to an inverter 140 which converts a direct-current power supplied from the fuel cell 110 or the battery 120 into an alternate-current power. Moreover, between the fuel cell 110 and the inverter 140, a DC/DC converter (hereinafter referred to as the FC converter) 155 is provided which controls a terminal voltage (the output voltage) Vfc of the fuel cell 110, and between the battery 120 and the inverter 140, a DC/DC converter (hereinafter referred to as the battery converter) 150 is provided which controls an input voltage Vin of the inverter 140.

A controller 160 calculates a demand power for the load 130 based on a detection signal (e.g., a detection signal indicating the open degree of an accelerator pedal) supplied from a sensor group 170 including a sensor for the accelerator pedal and the like, and the controller controls the inverter 140 based on the calculated demand power, whereby a power corresponding to the demand power is supplied to the load 130 through the inverter 140.

PRIOR ART DOCUMENT

Patent Document

[Patent Document 1] Japanese Patent Application Laid-Open No. 2000-12059

DISCLOSURE OF THE INVENTION

Problems to be Solved by the Invention

On calculating the demand power for the load 130 in the FCHV system 100, the controller 160 determines a targeted input voltage (hereinafter referred to as the target input voltage) Vtin of the inverter 140, and determines a targeted output terminal voltage (hereinafter referred to as the target output terminal voltage) Vtfc of the fuel cell 110.

Here, FIG. 8 is a diagram illustrating a relation between the input voltage Vin of the inverter 140 and the output terminal voltage Vfc of the fuel cell 110 in a case where the demand power for the load 130 varies. It is to be noted that in FIG. 8, the variance of the input voltage Vin of the inverter 130 is shown by a solid line, and the variance of the output terminal voltage Vfc of the fuel cell 110 is shown by a dotted line.

For example, in a case where a driver deeply steps on the accelerator pedal and this or another operation rapidly increases the demand power for the load 130, the target input voltage Vtin of the inverter 140 shifts to a high voltage side by the battery converter 150 (see arrow α of FIG. 8), whereas the target output terminal voltage Vtfc of the fuel cell 110 shifts to a low voltage side by the FC converter 150 (see arrow β of FIG. 8).

In consequence, the input voltage Vin of the inverter 130 is rapidly raised toward the set target input voltage Vtin (see Δ of FIG. 8) on a high voltage side by the battery converter 150, and the output terminal voltage Vfc of the fuel cell 110 is rapidly lowered toward the set target output terminal voltage (see ▲ of FIG. 8) by the FC converter 155. However, such rapid variances of the input voltage Vin of the inverter 140 and the output terminal voltage Vfc of the fuel cell 110 require the operation of the FC converter 150 in excess of a control limit (the operation in a controllable response frequency range), and there has been fear for a problem that control breakdown might be caused.

The present invention has been developed in view of situations described above, and an object thereof is to provide a fuel cell system or the like which can realize stable converter control even in a case where the rapid variances of the input voltage of an inverter and the output terminal voltage of a fuel cell are demanded.

Means for Solving the Problem

To achieve the above object, the fuel cell system according to the present invention is a fuel cell system comprising: a fuel cell and an accumulator connected in parallel with a load; an inverter connected to the load; a first voltage conversion unit provided between the fuel cell and the inverter to control the terminal voltage of the fuel cell; a second voltage conversion unit provided between the accumulator and the inverter to control the input voltage of the inverter; and control means for controlling the operations of the respective voltage conversion units, characterized in that in a case where the output power of the fuel cell is increased, the control means controls the operation of the second voltage conversion unit so that the input voltage of the inverter reaches a set demand voltage, and then controls the operation of the first voltage conversion unit so that the terminal voltage of the fuel cell becomes an output demand voltage corresponding to the output power.

According to such a constitution, when the output power of the fuel cell is increased, after controlling the input voltage of the inverter by the second voltage conversion unit (see α of FIG. 8), the output terminal voltage of the fuel cell is controlled by the first voltage conversion unit (see β of FIG. 8). According to such control, the first voltage conversion unit is not requested to perform any operation in excess of a control limit (the operation in a controllable response frequency range), and a conventional problem that control breakdown is caused can be prevented in advance, whereby stable converter control can be realized.

Here, in the above constitution, a configuration is preferable in which in a case where the change ratio of the output power demanded for the fuel cell exceeds a set threshold value, the control means controls the operation of the second voltage conversion unit so that the input voltage of the inverter reaches the set demand voltage, and then controls the operation of the first voltage conversion unit so that the terminal voltage of the fuel cell becomes the output demand voltage corresponding to the output power.

Moreover, in the above constitution, a configuration is also preferable in which in a case where the sum of the change ratios of the output side voltage and input side voltage of the first voltage conversion unit exceeds a set threshold value, the control means controls the operation of the second voltage conversion unit so that the input voltage of the inverter reaches the set demand voltage, and then controls the operation of the first voltage conversion unit so that the terminal voltage of the fuel cell becomes the output demand voltage corresponding to the output power.

Furthermore, the fuel cell system according to the present invention is a fuel cell system comprising: a fuel cell and an accumulator connected in parallel with a load; an inverter connected to the load; a first voltage conversion unit provided between the fuel cell and the inverter to control the terminal voltage of the fuel cell; a second voltage conversion unit provided between the accumulator and the inverter to control the input voltage of the inverter; and control means for controlling the operations of the respective voltage conversion units, characterized in that in a case where the output power of the fuel cell is decreased, the control means controls the operation of the first voltage conversion unit so that the terminal voltage of the fuel cell reaches an output demand voltage corresponding to the output power, and then controls the operation of the second voltage conversion unit so that the input voltage of the inverter becomes a set demand voltage.

Here, in the above constitution, a configuration is preferable in which in a case where the change ratio of the output power demanded for the fuel cell exceeds a set threshold value, the control means controls the operation of the first voltage conversion unit so that the terminal voltage of the fuel cell reaches the output demand voltage corresponding to the output power, and then controls the operation of the second voltage conversion unit so that the input voltage of the inverter becomes the set demand voltage.

Moreover, in the above constitution, a configuration is also preferable in which in a case where the sum of the change ratios of the output side voltage and input side voltage of the first voltage conversion unit exceeds a set threshold value, the control means controls the operation of the first voltage conversion unit so that the terminal voltage of the fuel cell reaches the output demand voltage corresponding to the output power, and then controls the operation of the second voltage conversion unit so that the input voltage of the inverter becomes the set demand voltage.

Effect of the Invention

According to the present invention, even when the rapid variances of the input voltage of the inverter and the output terminal voltage of the fuel cell are demanded, stable converter control can be realized.

BEST MODE FOR CARRYING OUT THE INVENTION

A. Present Embodiment

Figure 1:
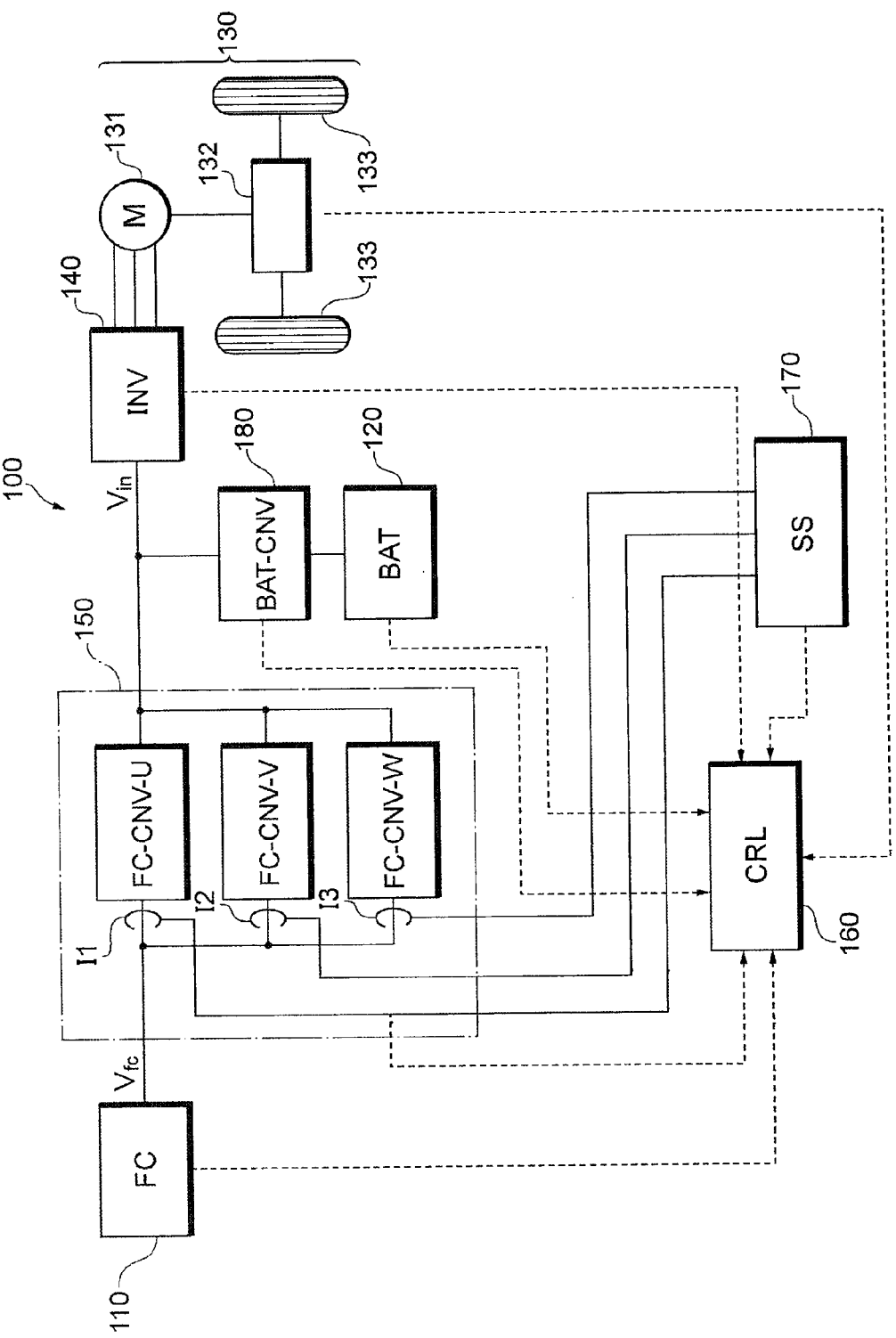
FIG. 1 is a system constitution diagram of an FCHV system according to the present embodiment.
Figure 7:
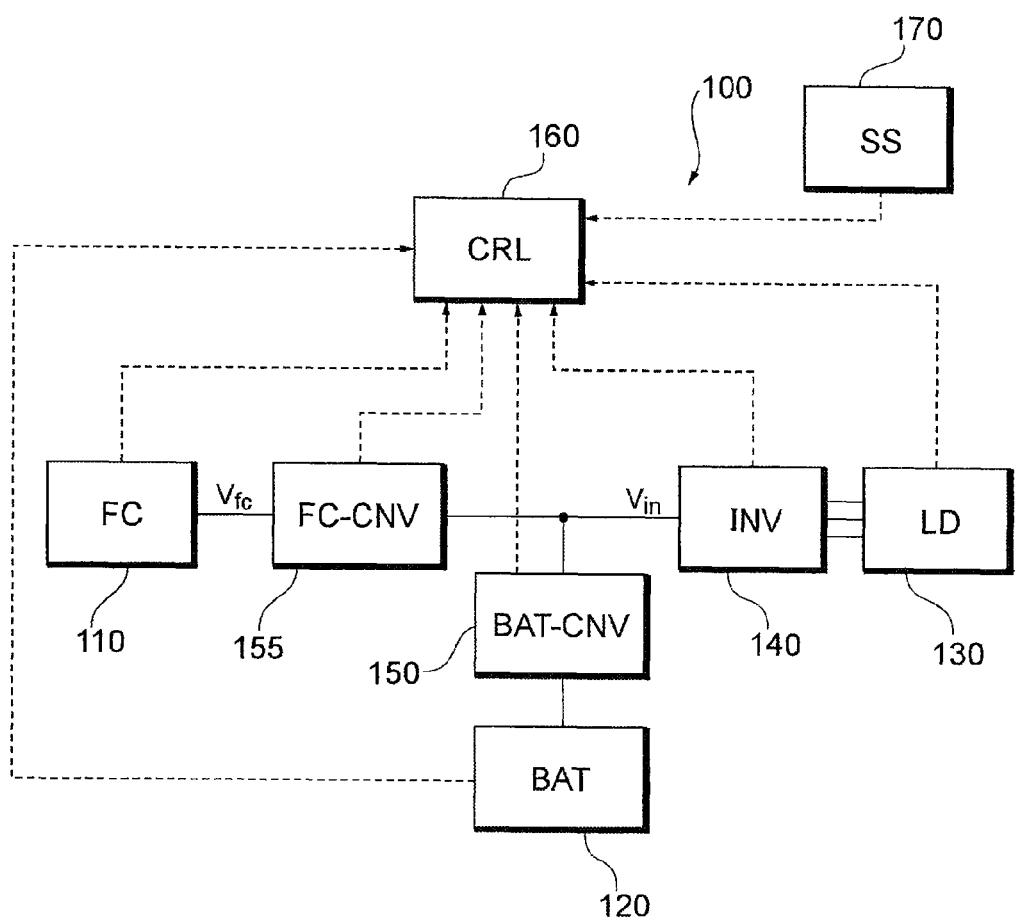
FIG. 7 is a system constitution diagram of a conventional FCHV system.

Hereinafter, an embodiment according to the present invention will be described with reference to the drawings. FIG. 1 shows the constitution of an FCHV system mounted in a vehicle according to the present embodiment. It is to be noted that in the following description, as one example of the vehicle, a fuel cell hybrid vehicle (FCHV) will be described, but the present invention can be applied to an electric car and the like. Moreover, the present invention can be applied to not only the vehicle but also various mobile apparatuses (e.g., a boat, an airplane, a robot, etc.), a stational power source and a portable type fuel cell system. To facilitate the understanding of the description, a part corresponding to FIG. 7 is denoted with the same reference numerals.

(System Constitution)

FIG. 1 is the whole system diagram of an FCHV system 100 according to the embodiment of the present invention.

The FCHV system 100 according to the present embodiment is especially characterized in that a DC/DC converter (hereinafter referred to as the battery converter) 180 is provided between a battery 120 and an inverter 140.

A fuel cell 110 is a solid polymer electrolyte type cell stack in which a plurality of unit cells are stacked in series. The fuel cell 110 is provided with a voltage sensor for detecting an output terminal voltage Vfc of the fuel cell stack 110, and a current sensor for detecting an output current (the FC current) (both are not shown in the drawing). In the fuel cell 110, an oxidizing reaction of formula (1) occurs in an anode pole, a reducing reaction of formula (2) occurs in a cathode pole, and an electromotive reaction of formula (3) occurs in the whole fuel cell 110.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Each unit cell has a structure in which an MEA obtained by sandwiching a polymer electrolyte film or the like between two electrodes of a fuel pole and an air pole is sandwiched between separators for supplying a fuel gas and an oxidizing gas. As to the anode pole, a catalyst layer for the anode pole is provided on a porous support layer, and as to the cathode pole, a catalyst layer for the cathode pole is provided on a porous support layer.

The fuel cell 110 is provided with a system which supplies the fuel gas to the anode pole, a system which supplies the oxidizing gas to the cathode pole and a system which supplies a cooling solution (all the systems are not shown in the drawing), and the amount of the fuel gas to be supplied and the amount of the oxidizing gas to be supplied are controlled in response to a control signal from a controller 160, whereby a desired power can be generated.

An FC converter (the first voltage conversion unit) 150 has a function of controlling the output terminal voltage Vfc of the fuel cell 110, and is a bidirectional voltage conversion unit which converts the FC output terminal voltage Vfc input on a primary side (the input side: the fuel cell 110 side) into a voltage value different from that on the primary side (raises or lowers the voltage) to output the voltage to a secondary side (the output side: the inverter 140 side) and which conversely converts the voltage input on the secondary side into a voltage different from that on the secondary side to output the voltage to the primary side. The FC converter 150 performs control so that the output terminal voltage Vfc of the fuel cell 110 becomes a voltage corresponding to a target output (i.e., a target output terminal voltage vfc).

The FC converter 150 is, for example, a booster converter, and uses a three-phase operation system. As a specific circuit system, the converter comprises a circuit constitution of a three-phase bridge type converter constituted of a U-phase 151, a V-phase 152 and a W-phase 153. In the circuit constitution of the three-phase bridge type converter, a circuit part similar to an inverter which once converts an input direct-current voltage into an alternate-current voltage and a part which again rectifies the alternate-current voltage to convert the voltage into a different direct-current voltage are combined.

Figure 2:
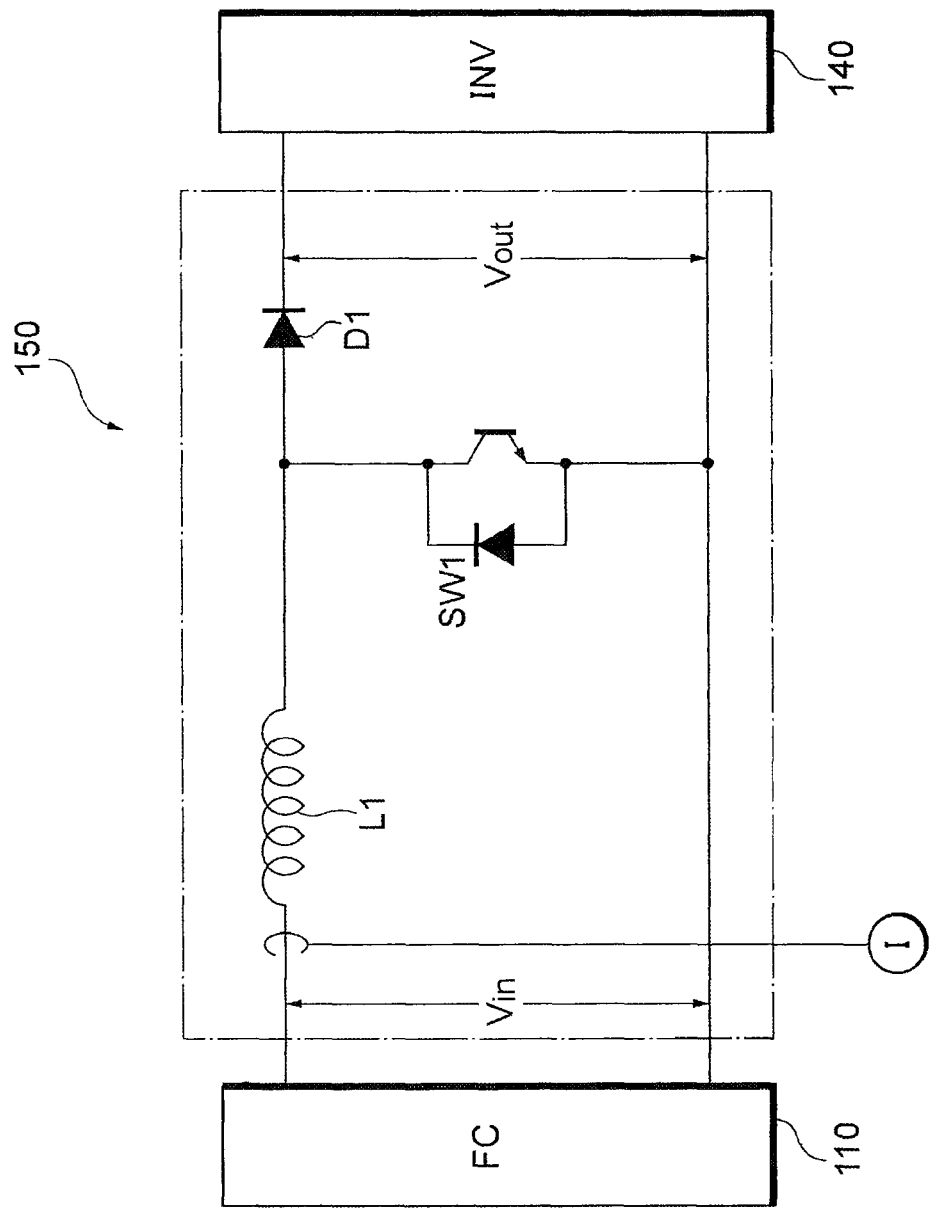
FIG. 2 is a diagram illustrating the constitution of a single-phase circuit for one phase of an FC converter according to the present embodiment.

FIG. 2 is a constitution diagram of a load drive circuit of an extracted circuit for one phase of the FC converter 150. It is to be noted that in the following description, a voltage before raised and input into the FC converter 150 is referred to as an input voltage Vin, and the raised voltage output from the FC converter 150 is referred to as an output voltage Vout.

As shown in FIG. 2, the FC converter 150 (for one phase) comprises a reactor L1, a diode D1 for rectification, and a switch element SW1 constituted of an insulated gate bipolar transistor (IGBT) and the like. The reactor L1 has one end thereof connected to an output end (not shown) of the fuel cell 110 and the other end thereof connected to a collector of the switching element SW1. Here, a current flowing through the reactor L1 is detected by current sensors I1 to I3 (see FIG. 1) for detecting reactor currents of phases. The switching element SW1 is interposed between a power source line of the inverter 140 and an earth line. Specifically, the collector of the switching element SW1 is connected to the power source line, and an emitter thereof is connected to the earth line. In such a constitution, first, when the switch SW1 is turned on, the current flows through the fuel cell 110→the inductor L1→the switch SW1, and at this time, the inductor L1 is energized by the direct current to accumulate magnetic energy.

Subsequently, when the switch SW1 is turned off, an induction voltage by the magnetic energy accumulated by the inductor L1 is superimposed onto the FC voltage (the input voltage Vin) of the fuel cell 110, and an operation voltage (the output voltage Vout) higher than the input voltage Vin is output from the inductor L1, thereby outputting the output current through the diode D1. The controller 160 appropriately changes a duty ratio (described later) of ON/OFF of the switch SW1 to obtain the desired output voltage Vout. It is to be noted that the input current of the FC converter 150 (i.e., the output current of the fuel cell 110) is detected by a current sensor (not shown), and the input voltage of the FC converter 150 (i.e., the output voltage of the fuel cell 110) is detected by a voltage sensor (not shown).

Turning back to FIG. 1, the battery (the accumulator) 120 and the fuel cell 110 are connected in parallel with a load 130, and the battery functions as a storage source of a surplus power, a storage source of regenerative energy during regenerative braking or an energy buffer during load variance accompanying the acceleration or deceleration of the fuel cell vehicle. As the battery 130, for example, a nickel/cadmium battery, a nickel/hydrogen battery or a secondary battery such as a lithium secondary battery is utilized.

The battery converter (the second voltage conversion unit) 180 has a function of controlling the input voltage Vin of the inverter 140, and has a circuit constitution similar to the FC converter 150. In the present embodiment, in a case where the demand power for the load 130 rapidly varies (hereinafter, the case of increase is assumed), first, the battery converter 180 is controlled so that the input voltage Vin of the inverter 130 becomes a set target input voltage Vtin (see Δ of FIG. 8). Then, after the input voltage Vin of the inverter 130 reaches the target input voltage Vtin, the FC converter 140 is controlled so that the output terminal voltage Vfc of the fuel cell 110 becomes a set target output terminal voltage Vtfc. In this way, in a case where the demand power of the fuel cell 110 rapidly increases, after controlling the input voltage Vin of the load 130 by the battery converter 180, the output terminal voltage Vfc of the fuel cell 110 is controlled by the FC converter 140, whereby stable converter control can be realized (a detailed operation will be described later). It is to be noted that the circuit constitution of the battery converter 180 is not limited to the above constitution, and any constitution can be employed as long as the input voltage Vin of the inverter 140 can be controlled.

The inverter 140 is, for example, a PWM inverter driven by, for example, a pulse width modulation system, and follows a control instruction from the controller 160 to convert the direct-current power output from the fuel cell 110 or the battery 120 into a three-phase alternate-current power, thereby controlling the rotation torque of a traction motor 131.

The traction motor 131 supplies a main power for the present vehicle, and generates a regenerative power during deceleration. A differential 132 is a speed decreasing gear, and decelerates the high speed rotation of the traction motor 131 to a predetermined rotation number to rotate a shaft provided with wheels 133. The shaft is provided with a wheel speed sensor (not shown), and the vehicle speed of the vehicle or the like is detected by this sensor. It is to be noted that in the present embodiment, all devices that can operate by a power received from the fuel cell 110 (including the traction motor 131 and the differential 132) are generically referred to as the load 130.

The controller 160 is a computer system for controlling the FCHV system 100, and comprises, for example, an CPU, an RAM, an ROM and the like. The controller 160 inputs various signals supplied from a sensor group 170 (e.g., a signal indicating the open degree of an accelerator pedal, a signal indicating the vehicle speed, a signal indicating the output current or output terminal voltage of the fuel cell 110, etc.), to obtain the demand power for the load 130 (i.e., the demand power for the whole system).

The demand power for the load 130 is, for example, the total value of a vehicle running power and an auxiliary machine power. The auxiliary machine power includes a power consumed by car-mounted auxiliary machines (a humidifier, an air compressor, a hydrogen pump, a cooling water circulation pump, etc.), a power consumed by devices necessary for the vehicle running (a transmission, a vehicle wheel control device, a steering device, a suspension device, etc.), a power consumed by devices disposed in a cabin space (an air conditioning system, a lighting fixture, an audio, etc.) and the like.

Subsequently, the controller (the control unit) 160 determines the distribution of the output powers of the fuel cell 110 and the battery 120 to calculate a power generation instructing value. On obtaining the demand powers of the fuel cell 110 and the battery 120, the controller 160 controls the operations of the FC converter 150 and the battery converter 180 so as to acquire these demand powers. Then, the controller 160 outputs, to the inverter 140, for example, alternate-current voltage instructing values of the U-phase, V-phase and W-phase as a switching instruction so as to acquire a target torque corresponding to the open degree of the accelerator pedal, thereby controlling the output torque and rotation number of the traction motor 131.

Figure 8:
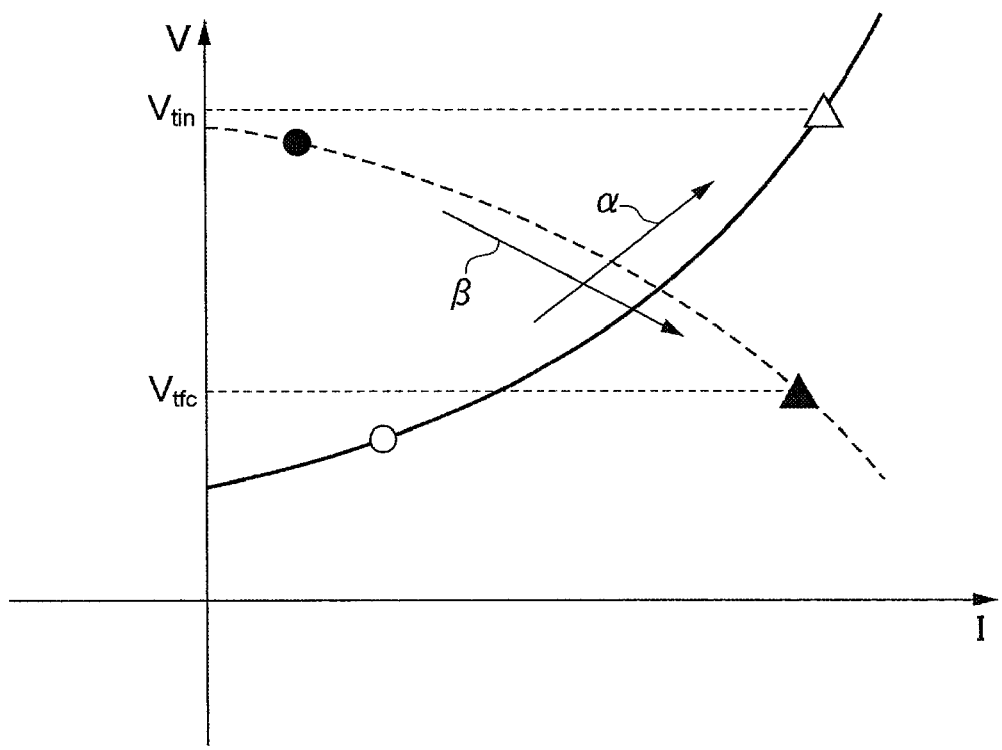
FIG. 8 is a diagram illustrating a relation between the input voltage of an inverter and the output terminal voltage of a fuel cell in a case where there is a variance in a demand power for a load.

Furthermore, in a case where the demand power of the fuel cell 110 satisfies predetermined conditions (here, a case where the demand power rapidly increases), to realize stable converter control, the controller 160 first controls the battery converter 180 so that the input voltage Vin of the inverter 130 becomes the set target input voltage (the set demand voltage) Vtin (see Δ of FIG. 8). Then, after the input voltage Vin of the inverter 130 reaches the target input voltage Vtin, the controller performs processing of controlling the FC converter 140 so that the output terminal voltage Vfc of the fuel cell 110 becomes the set target output terminal voltage (output demand in summer) Vtfc (hereinafter referred to as the converter stabilization processing).

Here, the above predetermined conditions can arbitrarily be set and changed. For example, in a case where the change ratio of the demand power of the fuel cell 110 exceeds a set threshold value (the first condition) or in a case where the sum of the change ratios of the input side voltage and output side voltage of the FC converter 150 exceeds a set threshold value (the second condition), the converter stabilization processing may be executed. It is to be noted that the set threshold values may beforehand be obtained by an experiment or the like, and stored in a memory (not shown) or the like. Moreover, the threshold value may be a fixed value, but may appropriately be set and changed in accordance with operation conditions, user's operation or the like. Hereinafter, a case where the first condition is employed as a predetermined condition will be described as an example.

(Operation)

Figure 3:
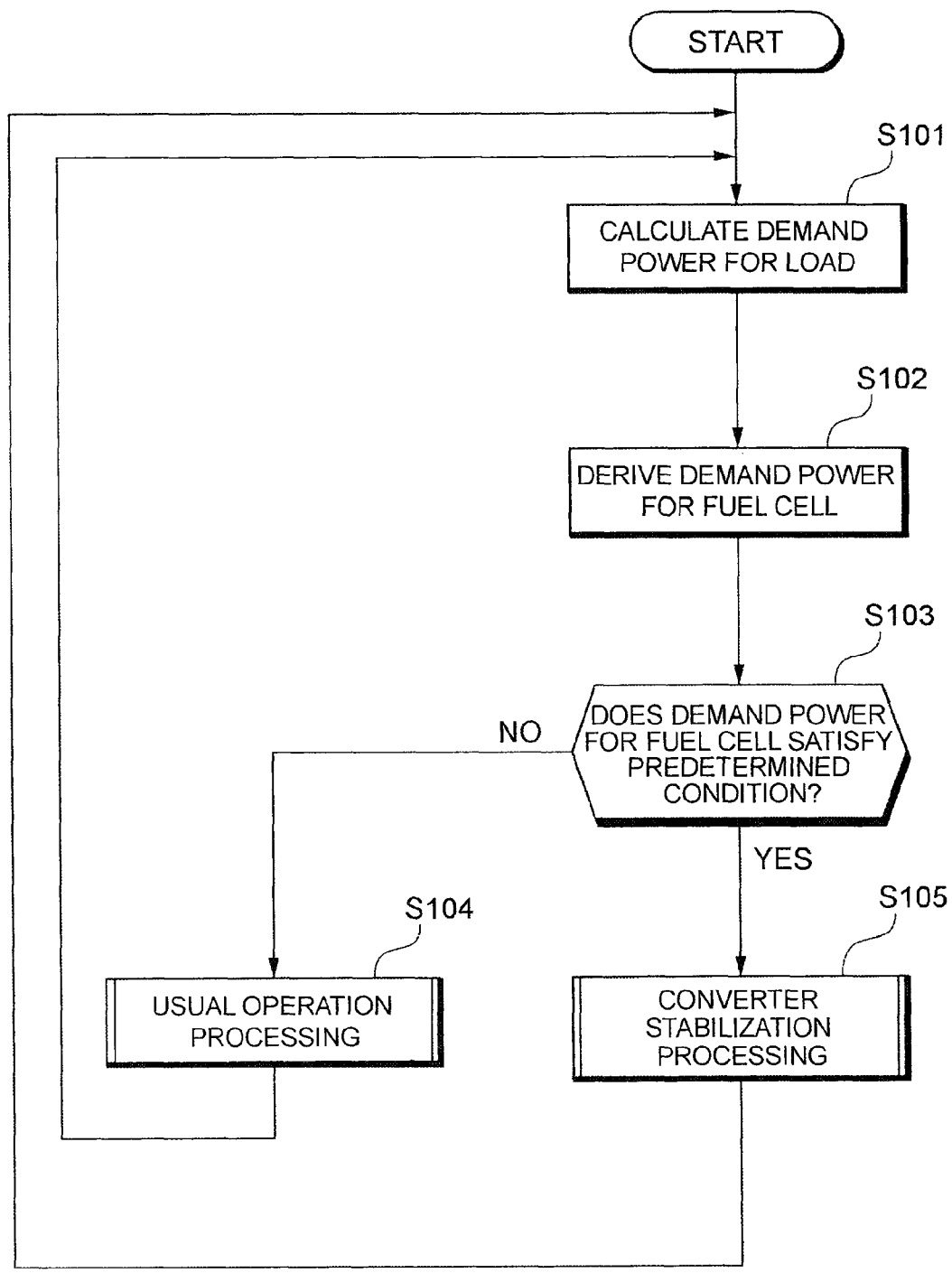
FIG. 3 is a flow chart showing the operation of the FCHV system according to the present embodiment.

FIG. 3 is a flow chart showing a processing operation in the FCHV system 100.

The controller 160 inputs various signals supplied from the sensor group 170 (e.g., the signal indicating the open degree of the accelerator pedal, the signal indicating the vehicle speed, the signal indicating the output current or output terminal voltage of the fuel cell 110, etc.), to calculate the demand power for the load 130 (step S1). The controller 160 determines the distribution of the output powers of the fuel cell 110 and the battery 120, and calculates the power generation instructing value to obtain the demand power of the fuel cell 110 (step S2). Then, the controller 160 judges whether or not the demand power of the fuel cell 110 satisfies the predetermined condition (step S3). As described above, in the present embodiment, the first condition (i.e., whether or not the change ratio of the demand power of the fuel cell 110 exceeds the set threshold value) is set as the predetermined condition, whereby the controller 160 judges whether or not the change ratio of the demand power of the fuel cell 110 exceeds the set threshold value.

In a case where the controller 160 judges that the change ratio of the demand power of the fuel cell 110 does not exceed the set threshold value (the step S103; NO), the controller advances to step S104 to execute usual operation processing. On the other hand, in a case where a driver deeply steps on the accelerator pedal and this or another operation rapidly increases the demand power of the fuel cell 110, the controller 160 judges that the change ratio of the demand power of the fuel cell 110 exceeds the set threshold value (the step S103; YES), to execute the converter stabilization processing (step S105).

<Usual Operation Processing>

On shifting to the step S104, the controller 160 controls the supply of the oxidizing gas and fuel gas so that the amount of the power to be generated by the fuel cell 110 matches a target power (i.e., the power generation instructing value of the fuel cell 110).

Furthermore, the controller 160 controls the FC converter 150 to regulate the output terminal voltage Vfc of the fuel cell 110, thereby controlling the operation point (the output current, the output voltage) of the fuel cell 110. It is to be noted that the output voltage of the fuel cell 110 during the usual operation processing indicates a behavior in a range of, for example, 1.0 V/cell to 0.6 V/cell. To acquire the target torque corresponding to the open degree of the accelerator pedal, the controller 160 outputs, to the inverter 140, the alternate-current voltage instructing values of the U-phase, V-phase and W-phase as the switching instruction, thereby controlling the output torque and rotation number of the traction motor 131.

<Converter Stabilization Processing>

Figure 4:
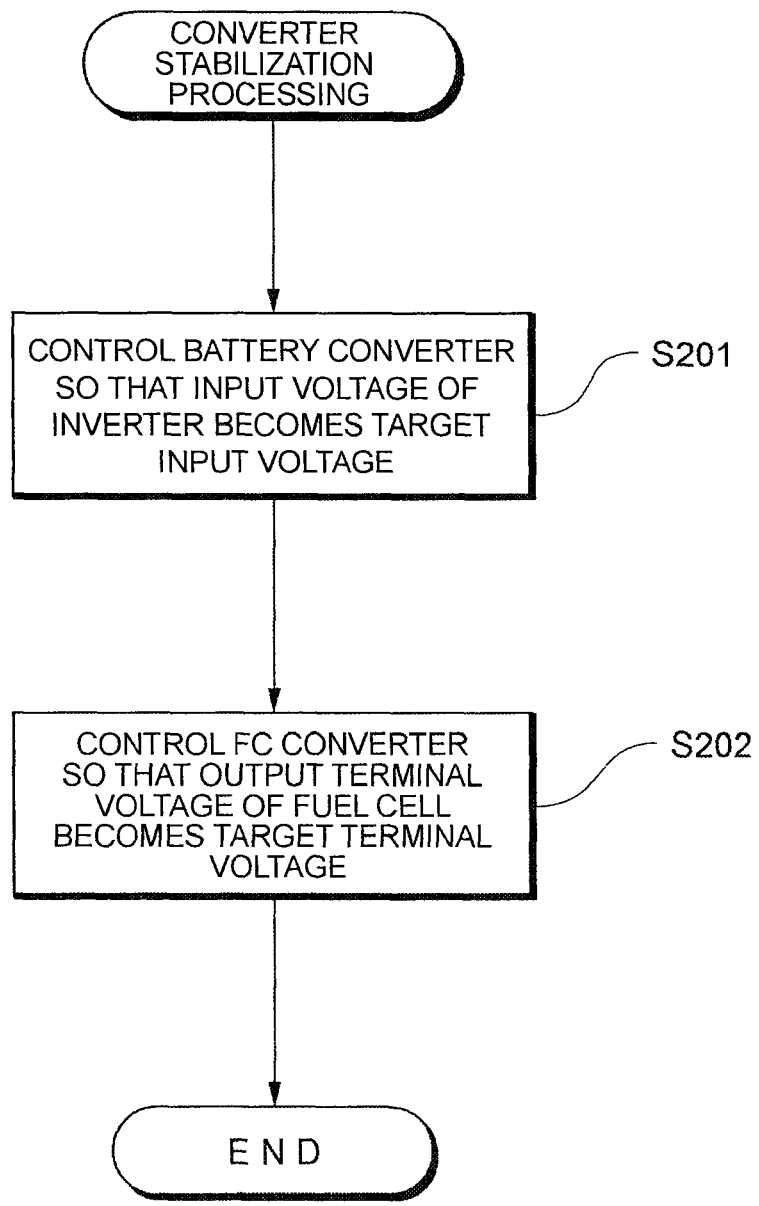
FIG. 4 is a flow chart showing converter stabilization processing according to the present embodiment.

On shifting to the step S105, the controller 160 executes a converter stabilization processing flow as shown in FIG. 4. The flow will be described in detail. The controller 160 first controls the battery converter 180 so that the input voltage Vin of the inverter 130 becomes the set target input voltage Vtin (see Δ of FIG. 8) (step S201). Then, after the input voltage Vin of the inverter 130 reaches the target input voltage Vtin, the controller 160 controls the FC converter 140 so that the output terminal voltage Vfc of the fuel cell 110 becomes the set target output terminal voltage Vtfc (step S202), thereby ending the processing.

As described above, according to the present embodiment, it is judged whether or not the demand power of the fuel cell 110 satisfies the predetermined condition (e.g., whether or not the change ratio of the demand power of the fuel cell 110 exceeds the set threshold value). In a case where it is judged that the demand power satisfies the condition, after controlling the input voltage Vin of the inverter 130 by the battery converter 180, the output terminal voltage Vfc of the fuel cell 110 is controlled by the FC converter 140. By such control, the FC converter 140 is not requested to perform any operation in excess of the control limit (the operation in the controllable response frequency range), and the conventional problem that the control breakdown is caused can be prevented in advance, whereby the stable converter control can be realized.

B. Modification (1) In the above present embodiment, as the example in which the change ratio of the demand power of the fuel cell 110 exceeds the set threshold value, there has been described the case where the demand power of the fuel cell 110 rapidly increases (i.e., the case where the change ratio of the demand power is positive), but the present invention can similarly be applied to a case where the demand power of the fuel cell 110 rapidly decreases (i.e., the case where the change ratio of the demand power is negative).

Figure 5:
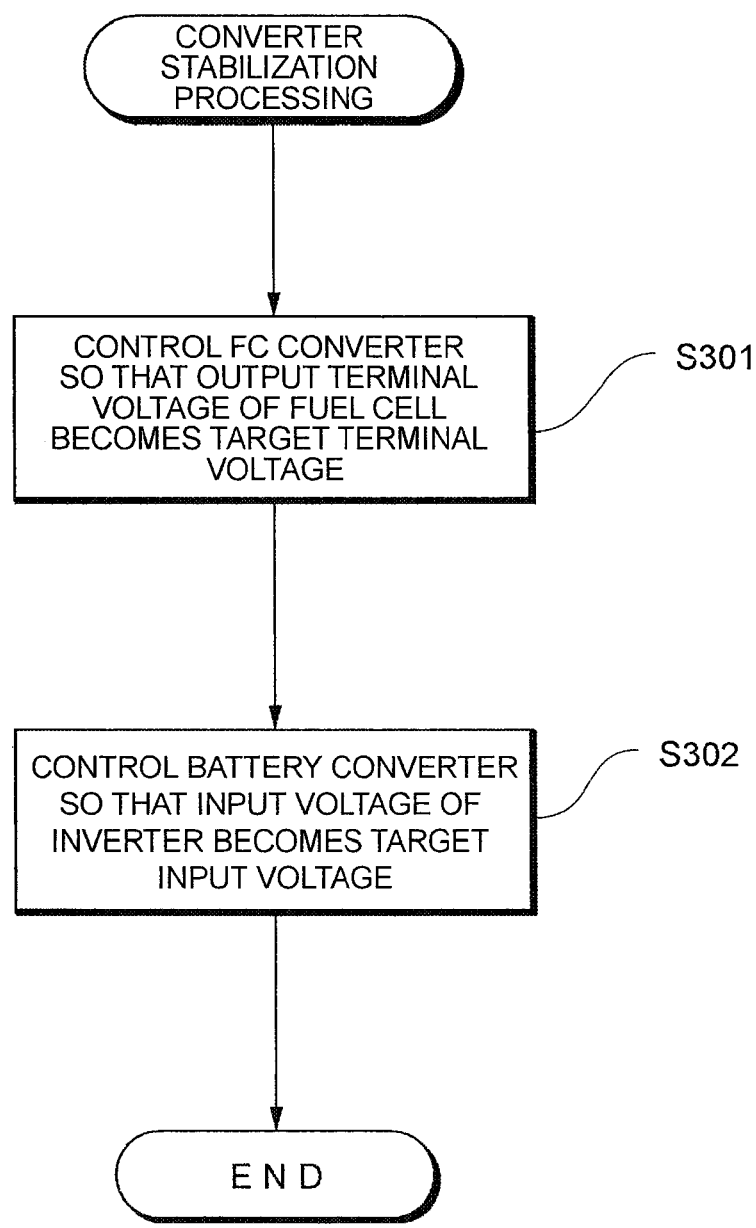
FIG. 5 is a flow chart showing converter stabilization processing according to a modification.

FIG. 5 is a flow chart showing converter stabilization processing according to the modification.

In a case where a driver deeply steps on an accelerator pedal and this or another operation rapidly decreases the demand power of a fuel cell 110, a controller 160 executes the converter stabilization processing shown in FIG. 5. The processing will be described in detail. The controller 160 first controls an FC converter 140 so that an output terminal voltage Vfc of the fuel cell 110 becomes a set target output terminal voltage (the output demand voltage) Vtfc (step S301). Then, after the output terminal voltage Vfc of the fuel cell 110 reaches a target input voltage Vtin, the controller 160 controls a battery converter 180 so that a input voltage Vin of an inverter 130 becomes a set target input voltage (the set demand voltage) Vtin (step S302), thereby ending the processing.

By such control, the FC converter 140 is not requested to perform any operation in excess of the control limit (the operation in the controllable response frequency range), and the conventional problem that the control breakdown is caused can be prevented in advance, whereby the stable converter control can be realized.

Here, as a predetermined condition in the modification, for example, in a case where the change ratio of the demand power of the fuel cell 110 exceeds a set threshold value (the third condition) or a case where the change ratios of the input side voltage and output side voltage of the FC converter 150 exceed set threshold values (the fourth condition), the converter stabilization processing may be executed. It is to be noted that the set threshold values may beforehand be obtained by an experiment or the like, and stored in a memory (not shown) or the like. Moreover, the threshold value may be a fixed value, but may appropriately be set and changed in accordance with operation conditions, user's operation or the like.

Moreover, in the above present embodiment, output current-output voltage characteristics (the I-V characteristics) of the fuel cell 110 have not especially been mentioned, but the I-V characteristics of the fuel cell 110 vary in accordance with an operation situation or the like.

Figure 6:
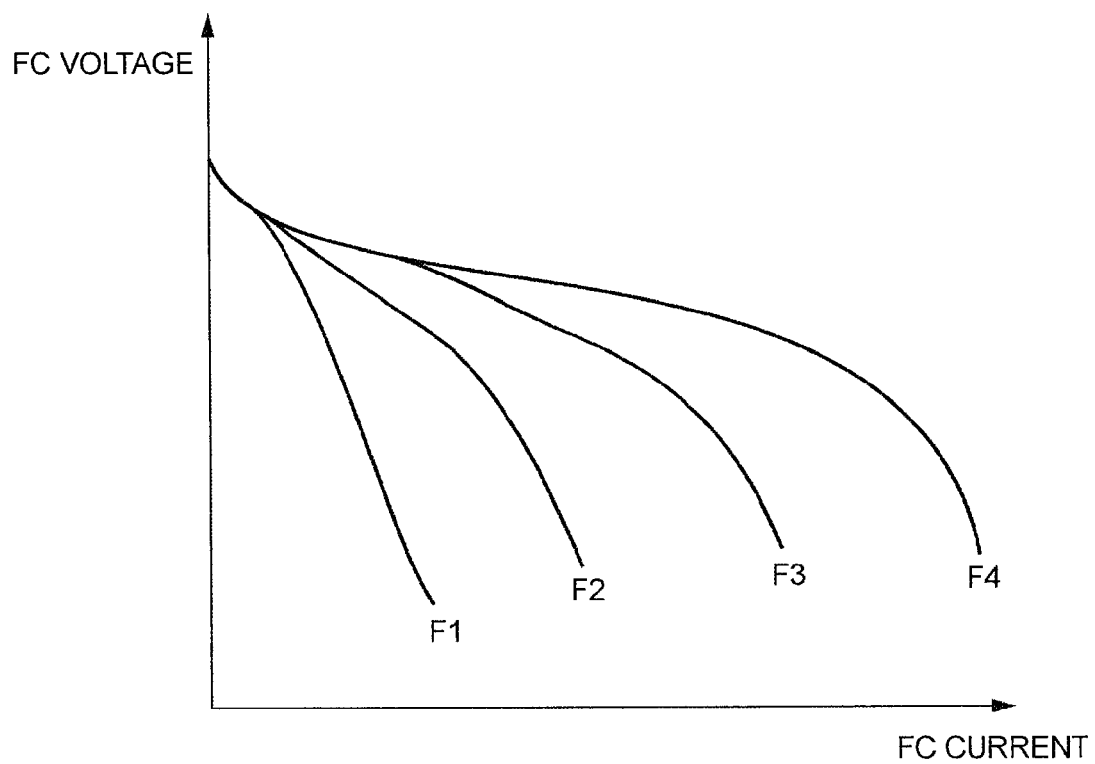
FIG. 6 is a diagram illustrating a relation between the flow rate of a gas and I-V characteristics of a fuel cell according to the modification.

FIG. 6 is a diagram illustrating a relation between the amount of the oxidizing gas and fuel gas to be supplied (the flow rate of the gases) and the I-V characteristics of the fuel cell 110. In FIG. 6, I-V characteristics F1, F2, F3 and F4 are shown in order from a small gas flow rate.

The controller 160 stores a characteristic map shown in FIG. 6 in a memory (not shown), and first grasps the flow rate of the gases at the corresponding time by use of a flow rate meter or the like in a case where the converter stabilization processing is executed. Then, the controller 160 reads the I-V characteristics (e.g., the I-V characteristic F2, etc.) corresponding to the grasped gas flow rate, and obtains a targeted operation point (the output current, the output voltage) by use of the read I-V characteristics. The subsequent operation can be described in the same manner as in the present embodiment, and hence the description thereof is omitted. In this way, a plurality of types of I-V characteristics of the fuel cell 110 may be prepared to determine the operation point by use of the I-V characteristics corresponding to the operation situations.

DESCRIPTION OF REFERENCE NUMERALS

100 . . . FCHV system, 110 . . . fuel cell, 120 . . . battery, 130 . . . load, 140 . . . inverter, 150 . . . FC converter, 160 . . . controller, 170 . . . sensor group, and 180 . . . battery converter.

The invention claimed is:

1. A fuel cell system comprising:
   a fuel cell and an accumulator connected in parallel with a load;
   an inverter connected to the load;
   a first voltage conversion unit provided between the fuel cell and the inverter to control the terminal voltage of the fuel cell;
   a second voltage conversion unit provided between the accumulator and the inverter to control the input voltage of the inverter; and
   a control device for controlling the operations of the respective voltage conversion units, the control device programmed to, when the output power of the fuel cell is increased, control the operation of the second voltage conversion unit so that the input voltage of the inverter reaches a set demand voltage, and programmed to control the operation of the first voltage conversion unit so that the terminal voltage of the fuel cell becomes an output demand voltage corresponding to the output power.

2. The fuel cell system according to claim 1, wherein in a case where the sum of the change ratios of the output side voltage and input side voltage of the first voltage conversion unit exceeds a set threshold value, the control device is programmed to control the operation of the second voltage conversion unit so that the input voltage of the inverter reaches the set demand voltage, and then controls the operation of the first voltage conversion unit so that the terminal voltage of the fuel cell becomes the output demand voltage corresponding to the output power.

3. The fuel cell system according to claim 1, wherein in a case where the change ratio of the output power demanded for the fuel cell exceeds a set threshold value, the control device is programmed to control the operation of the first voltage conversion unit so that the terminal voltage of the fuel cell reaches the output demand voltage corresponding to the output power, and then controls the operation of the second voltage conversion unit so that the input voltage of the inverter becomes the set demand voltage.

4. A fuel cell system comprising:
   a fuel cell and an accumulator connected in parallel with a load;
   an inverter connected to the load;
   a first voltage conversion unit provided between the fuel cell and the inverter to control the terminal voltage of the fuel cell;
   a second voltage conversion unit provided between the accumulator and the inverter to control the input voltage of the inverter; and
   a control device for controlling the operations of the respective voltage conversion units, the control device programmed to, when the output power of the fuel cell is decreased, control the operation of the first voltage conversion unit so that the terminal voltage of the fuel cell reaches an output demand voltage corresponding to the output power, and programmed to control the operation of the second voltage conversion unit so that the input voltage of the inverter becomes a set demand voltage.

5. The fuel cell system according to claim 4, wherein in a case where the change ratio of the output power demanded for the fuel cell exceeds a set threshold value, the control device is programmed to control the operation of the first voltage conversion unit so that the terminal voltage of the fuel cell reaches the output demand voltage corresponding to the output power, and then controls the operation of the second voltage conversion unit so that the input voltage of the inverter becomes the set demand voltage.

6. The fuel cell system according to claim 4, wherein in a case where the sum of the change ratios of the output side voltage and input side voltage of the first voltage conversion unit exceeds a set threshold value, the control device is programmed to control the operation of the first voltage conversion unit so that the terminal voltage of the fuel cell reaches the output demand voltage corresponding to the output power, and then controls the operation of the second voltage conversion unit so that the input voltage of the inverter becomes the set demand voltage.

* * * * *